(12) United States Patent
Kholodkov et al.

(10) Patent No.: US 11,776,176 B2
(45) Date of Patent: Oct. 3, 2023

(54) VISUAL REPRESENTATION OF DIRECTIONAL CORRELATION OF SERVICE HEALTH

(71) Applicant: Microsoft Technology Licensing, LLC, Redmond, WA (US)

(72) Inventors: Dmitry V. Kholodkov, Sammamish, WA (US); Donovan A. Isaak, Kenmore, WA (US); Mark R. Gilbert, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 359 days.

(21) Appl. No.: 16/389,353

(22) Filed: Apr. 19, 2019

(65) Prior Publication Data
US 2020/0334876 A1 Oct. 22, 2020

(51) Int. Cl.
*G06T 11/20* (2006.01)
*G06F 16/242* (2019.01)
(Continued)

(52) U.S. Cl.
CPC .......... *G06T 11/206* (2013.01); *G06F 16/243* (2019.01); *G06F 16/254* (2019.01); *G06F 16/287* (2019.01); *G06F 16/29* (2019.01)

(58) Field of Classification Search
CPC .... G06T 11/206; G06F 16/243; G06F 16/287; G06F 16/254
See application file for complete search history.

(56) References Cited

U.S. PATENT DOCUMENTS 8,327,335 B2   12/2012   Noble et al.
8,437,984 B2    5/2013   Mcgreevy et al.
(Continued)

FOREIGN PATENT DOCUMENTS

WO    0075811 A2    12/2000
WO    2007030633 A2   3/2007

OTHER PUBLICATIONS

Walkenbach, J. (2010). Excel 2010 bible (vol. 593). John Wiley & Sons, pp. 1-1058.*
(Continued)

*Primary Examiner* — Sarah Lhymn
(74) *Attorney, Agent, or Firm* — Newport IP, LLC; Leonard J. Hope (57) ABSTRACT

A system for generating proportional diagrams. The system includes a user interface, a memory for storing executable program code, and one or more electronic processors. The electronic processors are functionally coupled to the memory and the user interface. The electronic processors are configured to receive a dataset from one or more servers, wherein the dataset comprises software service health data. The electronic processors are further configured to remove extraneous data from the dataset, extract relevant data points from the dataset, and determine one or more relational data strings within the extracted relevant data points. The electronic processors are also configured to determine a frequency of occurrence for each of the extracted relevant data points within the dataset, and generate the proportional relationship diagram by plotting the relevant data points, wherein the relevant data points are plotted based on the determined relational data string and the determine frequency of occurrence.

18 Claims, 3 Drawing Sheets

(51) Int. Cl.
  *G06F 16/28* (2019.01)
  *G06F 16/25* (2019.01)
  *G06F 16/29* (2019.01)

(56) References Cited

U.S. PATENT DOCUMENTS

| | | | |
|---|---|---|---|
| 8,763,133 | B2 | 6/2014 | Sher-Jan et al. |
| 9,141,882 | B1* | 9/2015 | Cao .................. G06F 16/35 |
| 10,290,125 | B2* | 5/2019 | Awadallah .......... G06F 16/3322 |
| 10,467,261 | B1* | 11/2019 | Doyle .................. G06F 16/287 |
| 2004/0059746 | A1* | 3/2004 | Error ................. G06F 16/24578 |
| 2011/0125895 | A1 | 5/2011 | Anderson et al. |
| 2013/0111386 | A1 | 5/2013 | Rhodes et al. |
| 2015/0095102 | A1 | 4/2015 | Hanley et al. |
| 2015/0149385 | A1* | 5/2015 | Sundaresan .......... G06F 16/338 705/347 |
| 2015/0286747 | A1* | 10/2015 | Anastasakos ....... G06F 16/9017 707/776 |
| 2016/0094431 | A1 | 3/2016 | Hall et al. |
| 2017/0032550 | A1* | 2/2017 | Vander Broek .... G06Q 30/0201 |
| 2018/0060297 | A1* | 3/2018 | Wegryn .............. G06F 16/3323 |

OTHER PUBLICATIONS

Dasiopoulou, et al., "Representing and Visualizing Text as Ontologies: a Case from the Patent Domain", Retrieved From: http://ceur-ws.org/Vol-1456/paper9.pdf, Jan. 1, 2015, pp. 83-90.

Hetzler, et al., "Multi-Faceted Insight Through Interoperable Visual Information Analysis Paradigms", in the Proceedings of IEEE Symposium on Information Visualization, Oct. 19 1998, pp. 137-144.

"International Search Report and Written Opinion Issued in PCT Application No. PCT/US20/024361", dated Jun. 24, 2020, 13 Pages.

* cited by examiner

VISUAL REPRESENTATION OF DIRECTIONAL CORRELATION OF SERVICE HEALTH

SUMMARY

Software has become both more complex and commonplace. Software is often provided as an online service. Providing online software services has also grown more complex. A service center server, or other servicing center, may receive multiple communications from users and information from other sources (for example, automatic error or issue data automatically generated by the software) regarding the usage and operation of a software service. The information received may relate to numerous and varied issues. Communications may include calls, e-mails, texts, web-based data entry, messages or readings from software sensors, etc. Typically, as the communications are received, information about the communication, including the reported issues are saved into service management databases. Service management databases provide a record of reported issues and other data. The data entered into the service management database can be complex and disparate, making analyzing the data difficult and time consuming. Ease in analysis would allow a developer or team to quickly identify the most common issues experienced, and prioritize their time accordingly. Thus, a system and method for condensing service data into a simplified and scalable visual representation of the service data, are described herein.

For example, one embodiment provides a system for generating proportional diagrams. The system includes a user interface, a memory for storing executable program code, and one or more electronic processors. The electronic processors are functionally coupled to the memory and the user interface. The electronic processors are configured to receive a dataset from one or more servers, wherein the dataset comprises software service health data. The electronic processors are further configured to remove extraneous data from the dataset, extract relevant data points from the dataset, and determine one or more relational data strings within the extracted relevant data points. The electronic processors are also configured to determine a frequency of occurrence for each of the extracted relevant data points within the dataset, and generate the proportional relationship diagram by plotting the relevant data points, wherein the relevant data points are plotted based on the determined relational data string and the determine frequency of occurrence.

A further embodiment provides a method for generating proportional relationship diagrams within a user interface of a computing device. The method include receiving, at the computing device, a dataset from one or more servers, wherein the dataset comprises software service health data. The method also includes removing extraneous data from the dataset, extracting relevant data points from the dataset, and determining one or more relational data string within the extracted relevant data points, all via the computing device. The method also includes determining, via the computing device, a frequency of occurrence for each of the extracted relevant data points within the dataset. The method also includes generating, via the computing device, a proportional relationship diagram for display on the user interface by plotting the relevant data points, wherein the relevant data points are plotted based on the determined relational data strings and the determined frequency of occurrence.

A further embodiment provides a system for generating proportional relationship diagrams for software service data. The system includes a user interface, a memory for storing executable program code, and one or more electronic processors, functionally coupled to the memory and the user interface. The one or more electronic processors are configured to receive a dataset from one or more servers, wherein the dataset comprises software service data. The one or more electronic processors are further configured to remove extraneous data from the dataset, extract word bigrams from the remaining data in the dataset, and determine one or more relational data strings within the extracted relevant data points within the data set. The one or more processors are further configured to remove extracted relevant data points based on determining that the frequency of occurrence of the extracted relevant data points is below a predetermined threshold. The processors are also configured to generate the proportional relationship diagram based on one or more parameters provided to the system via the user interface by plotting the relevant data points, wherein the relevant data points are plotted based on the determined relational data strings and the determined frequency of occurrence. The processors are also configured to export the generated proportional relationship diagram is exported as one or more of an image file and an interactive dataset.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Software companies may receive a large number of service notifications (for example, phone calls, web-based messages, e-mails, direct messages, etc.) related to one or more software packages provided by the software company. These service notifications may come from individual users, IT departments, or internal development groups. The quantity and variety of these service notifications can make quick and accurate analysis difficult. The following concepts describe devices, systems, and methods for providing a visual representation of the service notifications in a condensed and scalable form. While the general descriptions herein describe the above devices, systems, and methods as relating to the software service notifications, the following technology could be applied to other textual-based data, for example, general service notifications (for example, consumer products, commercial products, etc.), marketing research, survey data, etc.

Figure 1:
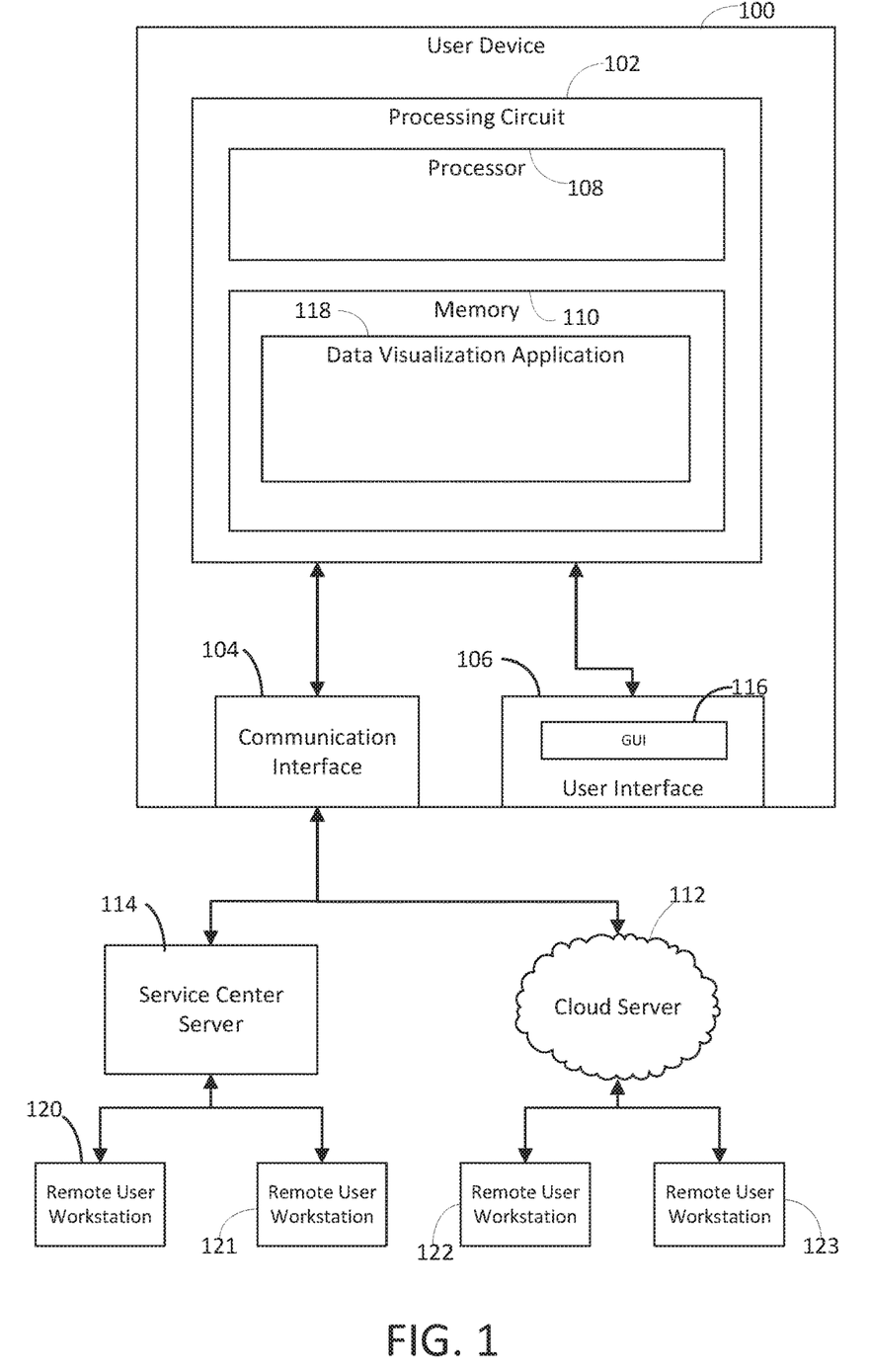
FIG. 1 is a block diagram of a computing device, according to some embodiments.

Turning now to FIG. 1, a block diagram of an example computing device 100 is shown, according to some embodiments. The computing device 100 may be a personal computer, a laptop computer, a tablet computer, a mobile device for example, a smartphone, a dedicated purpose computing device, etc. As shown in FIG. 1, the computing device 100 includes a processing circuit 102, a communication interface 104, and a user interface 106. The processing circuit 100 includes an electronic processor 108 and a memory 110. The processing circuit 102 may be communicably connected to one or more of the communication interface 104 and the user interface 106. The electronic processor 108 may be implemented as a programmable microprocessor, an application specific integrated circuit (ASIC), one or more field programmable gate arrays (FPGA), a group of processing components, or with other suitable electronic processing components.

The memory 110 (for example, a non-transitory, computer-readable medium) includes one or more devices (for example, RAM, ROM, Flash memory, hard disk storage, etc.) for storing data and/or computer code for completing or facilitating the various processes, layers, and modules described herein. The memory 110 may include database components, object code components, script components, or other types of code and information for supporting the various activities and information structure described in the present application. According to one example, the memory 110 is communicably connected to the electronic processor 108 via the processing circuit 102 and may include computer code for executing (for example, by the processing circuit 102 and/or the electronic processor 108) one or more processes described herein.

The communication interface 104 is configured to facilitate communication between the computing device 100 and one or more external devices or systems, for example, those shown in FIG. 1. The communication interface 104 may be or include wireless communication interfaces (for example, antennas, transmitters, receivers, transceivers, etc.) for conducting data communications between the computing device 100 and one or more external devices, for example, a cloud based server 112, one or more service center servers 114, or other remote services. In some embodiments, the communication interface 104 utilizes one or more wireless communication protocols, for example, cellular (3G, 4G, 5G, LTE, CDMA, etc.), Wi-Fi, Wi-MAX, ZigBee, ZigBee Pro, Bluetooth, Bluetooth Low Energy (BLE), RF, LoRa, LoRaWAN, Near Field Communication (NFC), Z-wave, 6LoWPAN, Thread, WiFi-ah, and/or other wireless communication protocols. The communication interface 104 may additionally be or include wired communication interfaces to facilitate wired communication between the computing device 100 and one or more other devices, for example, those described in FIG. 1. The wired communication interfaces may be or include jacks, wire terminals, ports, etc. for conducting data communications between the computing device 102 and one or more external devices. The communication interface 104 may include wired interfaces for example, Universal Serial Bus (USB) interfaces, USB-C interfaces, Firewire interfaces, CAT5 interfaces, universal asynchronous receiver/transmitter (UART) interfaces, serial (RS-232, RS-485), fiber optic interface, etc.

The user interface 106 may allow for a user to provide inputs to the computing device 100. For example, the user interface 106 may include a keyboard, a mouse, a trackpad, a touchscreen (for example, resistive, capacitive, inductive, etc.), or other known input mechanism. The user interface 106 may further provide a display to allow a user to view various data provided by the computing device 100. The user interface 106 may further be configured to provide a display of a graphical user interface ("GUI"), for example, GUI 116, which may be used by a user to provide inputs to the user interface 106, as well as display certain data to the user. In some embodiments, the electronic processor 108 may be configured to execute code from the memory 110 to generate the GUI 116 on the user interface 106. Further, the electronic processor 108 may be configured to receive and process inputs received via the GUI 116.

As described above, the memory 110 may be configured to store various processes, layers, and modules, which may be executed by the electronic processor 108 and/or the processing circuit 102. In one embodiment, the memory 110 may include one or more data visualization applications 118. The data visualization applications 118 may be configured to receive data from the service center server 114 and/or the cloud server 112, analyze the data, and generate a custom visualization of the data, as will be described in more detail below.

The service center server 114 and the cloud server 112 are both shown to be in communication with one or more remote user workstations 120-123. Remote user workstations 120-123 may be computing devices similar to the computing device 100 described above. The remote user workstations 120-123 may be used by multiple service personnel to input data related to service requests received by users of one or more software packages. In one example, the remote user workstations 120-123 are located at various call centers or service centers, where service information received via the service calls may be input into a service database. The service database may be stored within the service center server 114 or the cloud server 112. In some examples, the service database is distributed between one or more service center servers 114 and one or more cloud servers 112. In some embodiments, the cloud server 112 and the service center server 114 are configured to communicate with each other to update respective service databases contained therein.

Some or all of the remote user workstations 120-123 may further be configured to allow users to input other service data, for example, data reported via e-mail, web-entry, automatic feedback applications, etc. The remote user workstations 120-123 may be located in multiple geographic locations to better serve local customers or users.

In one example, the data visualization application 118 is configured to access service data input via the remote user workstations 120-123. In some embodiments, the data visualization application 118 accesses one or more service databases to access service data related to one or more software platforms. In some embodiments, the data visualization application 118 accesses the service databases by accessing one or more service center servers 114 and/or the cloud server 112. In some embodiments, the data visualization application 118 has a specific query that is communicated to one or both of the cloud server 112 and/or the service center server 114. The cloud server 112 and/or the service center server 114 may process the query and transmit the requested service data to the data visualization application 118 via the communication interface 104.

Upon receiving the data, the data visualization application 118 analyzes the data to break the data down into discrete data points, for example, words, word pairs (for example, bigrams), numbers, etc. The data visualization application 118 may further be configured to correlate the datum, as will be described in more detail below. Finally, the data visualization application 118 may be configured to generate one or more graphical outputs, for example, those disclosed below, which can allow a person viewing the graphical output to quickly review and analyze the correlated data. For example, the visualizations may allow a user to quickly determine certain items that occur with the greatest frequency, or which correlations are proportionally higher in occurrence. The visualizations provide relationships as well as proportionality of relationships between the discrete data points. As discussed in more detail below, the data visualization application 118 may generate a correlational relationship diagram.

While the data visualization application 118 is shown as being stored within the memory 110 of the computing device 100, in some embodiments, the data visualization application 118 is stored and/or processed in other devices or systems, for example the cloud server 112 and/or the service center server 114.

Figure 2:
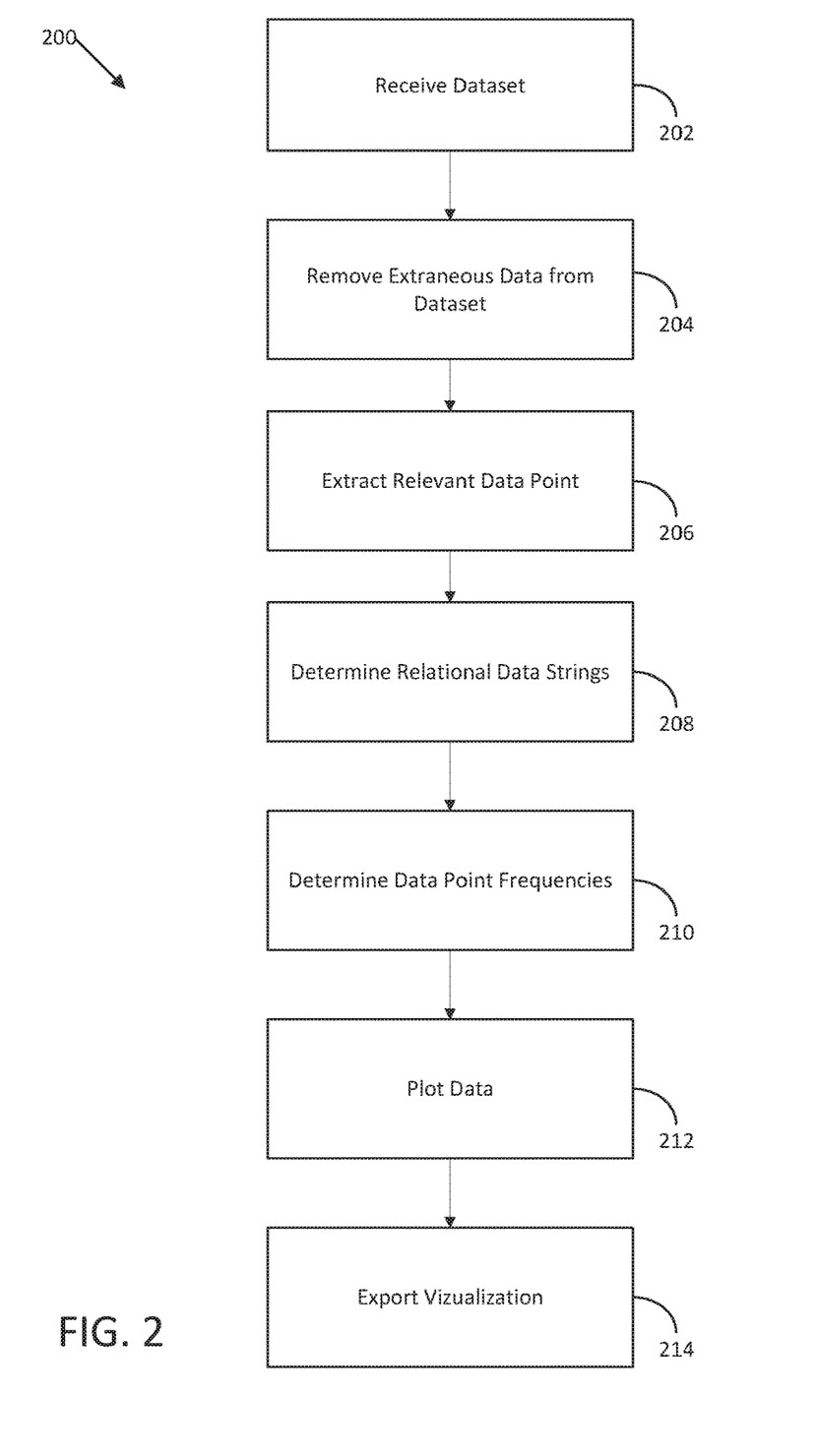
FIG. 2 is a flow chart illustrating a process for generating a proportional relationship diagram for service data, according to some embodiments.

Turning now to FIG. 2, a flow chart illustrating a process 200 for organizing and displaying data, for example, service data, is shown. The process 200 helps to organize and display the data in a manner that allows a user to quickly see frequency of data points and relationships between the data points. In some embodiments, the data is organized for interpretation by machine learning algorithms and/or artificial intelligence analysis. In one embodiment, the process 200 organizes and visualizes complex data sets so that that a human user can more easily comprehend and utilize the data. In one example, the process 200 analyzes voluminous and complex data (for example, service data), which may be massive in size, such that it would be extremely difficult for a user to obtain any valuable information from the data without the help of the process 200. The process 200 then generates a visualization of the analyzed data that is configured to display proportional relationships between the analyzed data. This proportional relationship is configured to provide the data in a human-digestible format, such that a qualified person could quickly see areas of concern (e.g. system level failures) or "hot spots" in the data. As will be described below, the displayed proportional relationships are visualized to allow for system level failures to be quickly identified. Also, by focusing on the proportionality of the relationships, even large volumes of data can be easily understood by allowing the user to identify the "hot spots" by viewing the areas with the greatest proportional representation. In some embodiments, the process 200 is performed via the computing device 100, and specifically via the data visualization application 118.

In the example illustrated, the data visualization application 118 receives data for analysis at block 202. The data visualization application 118 may initially request data from one or more databases, for example, the service databases described above. Accordingly, the received data may include service health data. As described above, the service databases may receive service data from one or more end users, for example, via remote user workstations 120-123. In one embodiment, the data visualization application 118 generates the request based on one or more definable parameters. In one example, the definable parameters may be provided via the user interface 106. The definable parameters may include time ranges, date ranges, geographical boundaries (for example, geographical location of the user requesting service, or geographical location of the service or call center), ticket types (for example, general issues, escalated issues, etc.), product versions (for example, software, hardware or firmware versions), software modules, software applications, and/or key terms. The data visualization application 118 then submits a query to the service databases to obtain the datasets contained within the definable parameters. The service databases then return the relevant datasets to the data visualization application 118 at block 202. As described above, the data visualization application 118 may communicate with the service databases and/or other data repositories using the communication interface 104.

Once the dataset is received at block 202, the data visualization application 118 removes extraneous data from the dataset at block 204. For example, the data visualization application 118 may be configured to remove "stop" words from a dataset containing text. Stop words may include special characters (for example, slashes, dashes, parenthesis, equation signs, punctuation marks, etc.). Stop words may further include prepositions, articles, (for example, "a," "the," "an,"), and/or curse words, and/or other defined "inappropriate words." Removing the stop words aids in reducing the dataset to words that support human-originating feedback and/or human-digestible data. In one embodiment, the data visualization application 118 attempts to reduce the dataset to contain substantially only nouns and verbs. However, other applications or configurations may require other portions of the dataset to be isolated, as required.

Upon removing the extraneous data from the dataset at block 204, relevant data points are extracted at block 206. In one embodiment, the data visualization application 118 extracts the relevant data points. The relevant data points within the dataset may include the remaining data in the dataset (for example, the dataset less the removed extraneous data/stop words). As described above, the remaining data may be comprised of nouns and verbs. However, in other examples, the remaining data may be other data types. In one embodiment, the remaining data in the dataset is broken down into bigrams. Generally, a bigram is a sequence of two adjacent elements from a string of tokens, which may include letters, syllables, or words. Thus, in the embodiment described above, an extracted bigram may include a noun and a verb, two nouns, or two verbs. The adjacency of the remaining data is determined without the previously present stop words. Thus, while the two words may not have been immediately adjacent to each other prior to the extraneous data being removed, the two words will be next to each other once the extraneous data is removed. However, in some examples, the remaining dataset may include placeholders for the removed stop words or data, and thus limit bigrams to words (or other data) that were within a predefined number of words. For example, if the distance threshold is set to four, then words that were previously separated by more than four words (for example, before the stop words were removed) are not combined into bigrams. While the above example used four as predefined threshold, it is contemplated that the predefined threshold could be more than four words or less than four words (for example, one word, two words, etc.). A user may configure the data visualization application 118 to change the predefined threshold based on the type of data being analyzed. In other examples, the data visualization application 118 automatically determines the predefined threshold based on one or more parameters of the data being analyzed. In other examples, the data visualization application 118 inserts placeholders or other markers in the remaining dataset indicating where certain punctuation marks were removed. The markers may indicate the type and location of the punctuation mark. In this example, the data visualization application 118 only allows bigrams to be created based on words that were previously within the same sentence or clause (for example, on one side of a colon or semi-colon).

As an example of a bigram, the words "safety" and "net" may be adjacent to each other in the remaining data set. Accordingly, the data visualization application 118 designates "safety net" as a bigram, and extracts the bigram accordingly. The data visualization application 118 then determines the bigrams for the remaining data in the relevant dataset and extracts those relevant data points for additional analysis as described below. While the above examples describe the use of bigrams, other methods for connecting data within the relevant dataset are also contemplated (for example, n-grams, concatenations, bag of words analysis, stemming, likelihood ratio tests, etc.). An advantage to using bigrams to combine relevant data points in the above described configurations, for example, in a service environment, allows for the data to be user friendly for a human user to view and quickly analyze, as will continue to be described in more detail below.

At block 208, the data visualization application 118 further analyzes the extracted data from block 206, and determine relational data strings within the extracted data. Relational data strings may be multiple bigrams combined into longer strings. For example, the words "safety" and "net" may have been preceded by the word "advanced." Thus, in one example, the data visualization application 118 determines there is a relationship between the bigrams "advanced safety" and "safety net." Similarly, if the word "net" was followed by the word "interface," the data visualization application 118 determines that there is a relationship between the bigrams "safety net" and "net interface." The data visualization application 118 may further determine that there is a relationship between the bigrams "advanced safety," "safety net," and "net interface." Thus, a relationship between multiple bigrams can be determined. In one example, the data visualization application 118 stores these relationships in a memory, for example, memory 110, for further analysis.

At block 210, the data visualization application 118 determines data point frequencies of occurrence. For example, the data visualization application 118 determines a frequency (for example, number of uses) of each bigram. In one embodiment, only the frequency of individual bigrams (for example, "safety net") are determined, and not the frequency of an entire rotational bigram string (for example, "advanced safety"→"safety net"→"net interface"). This allows for more granular data to be presented, as well as for allowing the relationships between bigrams to be determined and displayed to the user, as described below.

In some embodiments, the data visualization application 118 employs one or more noise-reduction applications to filter out "noise" from the extracted data. For example, the data visualization application 118 removes bigrams from the data set that have a frequency of occurrence less than a predetermined threshold. The predetermined threshold may be static (for example, the threshold does not change based on the dataset), or dynamic. Where the predetermined threshold is dynamic, the predetermined threshold may be changed by the data visualization application 118 based on certain parameters associated with the dataset. For example, if the dataset covers a prolonged period of time (for example 24 hours), the threshold is increased, and if the data covers a shorter period of time (for example, 8 hours), the threshold is decreased. In some examples, the predetermined threshold is set to one occurrence within the dataset (for example, if a bigram occurs only once, it will be removed from the dataset). In other examples, the predetermined threshold is set to two occurrences within the dataset. In one embodiment, the predetermined threshold is user configurable. By removing bigrams or other data points that fall below the predetermined threshold, random occurrences are removed from the final analysis. This eliminates a degree of "noise" in the data, thereby focusing the more critical data within the dataset. In the service environment, by removing random, or limited occurring data, the final data analysis can focus on systematic failure events instead of random issues.

The data visualization application 118 may store the frequencies in a memory, for example, memory 110, once the frequencies are determined for each bigram. As described above, in some instances, the data visualization application 118 only stores bigrams and their associated frequencies when the frequency of usage of the bigram is above the predetermined threshold.

At block 212, the data visualization application 118 plots the data points (for example, bigrams), as well as the determined relational data strings as a proportional relationship diagram. In some examples, the proportional relationship diagram may be referred to as a heat map or as operational knowledge objectivisation. As described above, a frequency of occurrence is determined for each bigram. Accordingly, the data visualization application 118 plots the bigrams as data frames. Each data frame may be organized as three elements: word one; word two; and the frequency of occurrence. The individual words of the bigrams may be plotted as points or dots. For example, in FIG. 3, word one of the bigram "safety net" is shown as data point 302 within proportional relationship diagram 300. Word two is shown as data point 304, and the frequency of occurrence is illustrated by the thickness of connector 306. For example, the higher the frequency of occurrence of a bigram, the thicker the line connecting the two words of the bigram in the proportional relationship diagram. By varying the thickness of the line connecting the words of a bigram, a user is easily able to see a stronger correlation between data points within the proportional relationship diagram. In some embodiments, and as shown in proportional relationship diagram 300, the connecting lines show a general proportionality between data points (bigram words) and not an actual frequency of occurrence.

Figure 3:
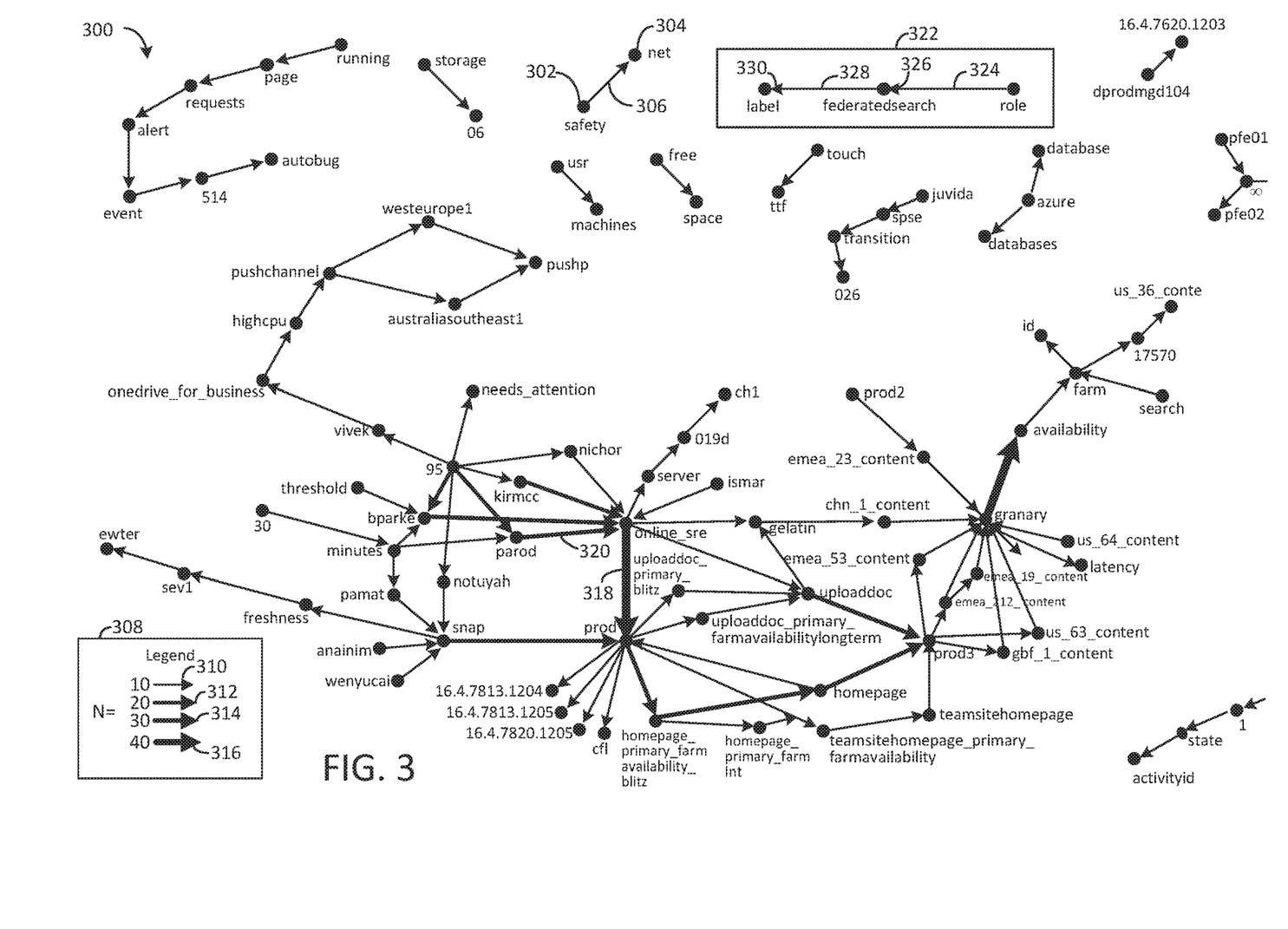
FIG. 3 is an example proportional relationship diagram, according to some embodiments.

For example, as shown in the legend 308, there are four different thicknesses of connecting lines. Connecting line 310 indicates that the frequency of occurrence is up to ten. Connecting line 312 indicates that the frequency of occurrence is up to twenty. Connecting line 314 indicates that the frequency of occurrence is up to 30. Connecting line 40 indicates that the frequency of use is up to 40. This allows the user to quickly see the greatest areas of correlation between bigram words, thereby allowing the user to focus in on the combination of terms with the highest frequency of use, if desired. This is clearly shown at connection line 318, connecting the words "online_sre" and "prod." Connection line 318 indicates that the bigram "online_sre prod" occurs at least 40 times in the received dataset. Similarly, the correlation between the words "parod" and "online_sre" is also shown as having a higher frequency of occurrence (30-39 occurrences in the dataset) in connecting line 320, but not as high as that shown in connecting line 318.

The data visualization application 118 may further plot all the relational data strings as determined in block 208. As shown in FIG. 3, the relationships between the bigrams is shown using the same connecting lines as described above. The connecting lines use a directional indicator (for example, an arrow) to further show the relationships between the data points for a single bigram, or multiple related bigrams. For example, in relational data string 322, there are two bigram shown. The first bigram includes the words "role" and "federatedsearch," and the second bigram is made up of the words "federatedsearch" and "label." The first connecting line 324 is shown going from the word "role" to the word "federatedsearch" based on the directional indicator 326. The second connecting line 328 is shown going from the word "federatedsearch" to the word "label" based on the directional indicator 330. Thus, a user can quickly determine that the word "role" always precedes the word "federatedsearch" and the word "federatedsearch" always precedes the word "label." Thus a user can quickly understand the relationships between the individual data points within the bigrams and/or larger relational data strings based on the bigrams.

In some embodiments, the data visualization application 118 uses a plotting program or application to perform the plotting described above. Example programs may include GG Graph, EP Network, or other plotting programs.

In some embodiments, the data visualization application 118 generates the above proportional relationship diagrams based on one or more user input parameters. In some embodiments, input parameters are provided via the computing device 100, for example, via the user interface 106 and/or the GUI 116. Example input parameters may include timelines (for example, date or time ranges of data to be plotted), geographical data (for example, location of end users reporting the issues), software types, issue types, or any other applicable parameter associated with the collected data. Thus proportional relationship diagrams are able to be generated based on specific input parameters. In some embodiments, multiple proportional relationship diagrams are generated over a period of time. The visualization of the proportional relationships can allow a person viewing the proportional relationship diagram to quickly see if known issues are decreasing, increasing, or remaining the same, based on observing changes in the correlational relationship between the data points. Thus, the generation of proportional relationship diagrams over time allow for a person viewing the diagram to quickly see improvement or new issues within the dataset, even where the dataset is large and complex.

Finally, at block 214, the proportional relationship diagram 300 is exported by the data visualization application 118. In one embodiment, the proportional relationship diagram 300 is exported as a standard image file, for example, .jpeg, .gif, and the like. However, in other embodiments, the proportional relationship diagram 300 may be exported in a file format that allows for a subsequent user to interface with the proportional relationship diagram, for example, by being able to access underlying data, manipulation of the data, and modifying the parameters associated with the proportional relationship diagrams. For example, a user may be able to change the date range to see how the proportional relationship diagram changes over time.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above.

What is claimed is:

1. A system for generating proportional relationship diagrams, the system comprising:
    a user interface;
    a memory for storing executable program code; and
    one or more electronic processors, functionally coupled to the memory and the user interface, the one or more electronic processors configured to:
    receive a dataset from one or more servers, wherein the dataset comprises software service health data;
    remove extraneous data from the dataset;
    extract relevant data points from the dataset, wherein the relevant data points are word bigrams;
    automatically filter the dataset by removing relevant data points below a minimum occurrence threshold, wherein the minimum occurrence threshold is dynamically determined based on a period of time over which the dataset is collected;
    determine one or more relational data strings within the extracted relevant data points, wherein the relational data strings comprise two or more related word bigrams;
    determine a frequency of occurrence for each of the extracted relevant data points within the dataset; and
    generate the proportional relationship diagram by plotting the relevant data points, wherein the relevant data points are plotted based on the determined relational data strings and the determined frequency of occurrence.

2. The system of claim 1, wherein the received dataset comprises words and symbols.

3. The system of claim 2, wherein the extraneous data is one or more of an article, a preposition, a symbol, and a curse word.

4. The method of claim 1, wherein plotting the relevant data points comprises generating a connection indicator between each word of the word bigram, and between the relational data strings, and further wherein the connection indicator is configured to indicate the frequency of occurrence of the relevant data points.

5. The system of claim 4, wherein the connection indicator is a directional line having a thickness, wherein the thickness is based on the determined frequency of occurrence.

6. The system of claim 1, wherein the electronic processors are configured to determine the relational data strings based on identifying words that are within n-spaces of each other within the data set, wherein n≥1.

7. The system of claim 1, wherein the proportional relationship diagram is generated based on one or more parameters provided to the system via the user interface.

8. The system of claim 7, wherein the one or more parameters comprise one or more of a date range, a time range, and a geographical location.

9. The system of claim 1, wherein the one or more electronic processors are further configured to export the generated proportional relationship diagram, wherein the exported proportional relationship diagram is exported as one or more of an image file and an interactive dataset.

10. The system of claim 1, wherein the one or more processors are further configured to remove extracted relevant data points based on determining that the frequency of occurrence of the extracted relevant data points is below a predetermined threshold.

11. A method for generating proportional relationship diagrams within a user interface of a computing device, the method comprising:
    receiving, at the computing device, a dataset from one or more servers, wherein the dataset comprises software service health data;
    removing, via the computing device, extraneous data from the dataset;
    extracting, via the computing device, relevant data points from the dataset, wherein the relevant data points are word bigrams;
    automatically filtering the dataset by removing relevant data points below a minimum occurrence threshold, wherein the minimum occurrence threshold is dynamically determined based on a period of time over which the dataset is collected;

determining, via the computing device, one or more relational data strings within the extracted relevant data points, wherein the relational data strings comprise two or more related word bigrams;

determining, via the computing device, a frequency of occurrence for each of the extracted relevant data points within the dataset; and generating, via the computing device, a proportional relationship diagram for display on the user interface by plotting the relevant data points, wherein the relevant data points are plotted based on the determined relational data strings and the determined frequency of occurrence.

12. The method of claim 11, wherein plotting the relevant data points comprises generating a connection indicator between each word of the word bigram, and between the relational data strings, and further wherein the connection indicator is configured to indicate the frequency of occurrence of the relevant data points.

13. The method of claim 12, wherein the connection indicator is a directional line having a thickness, wherein the thickness is based on the determined frequency of occurrence.

14. The method of claim 11, wherein the electronic processors are configured to determine the relational data strings based on identifying words that are within n-spaces of each other within the data set, wherein $n \geq 1$.

15. The method of claim 11, wherein the extraneous data is one or more of an article, a preposition, a symbol, and a curse word.

16. The method of claim 11, wherein the proportional relationship diagram is generated based on one or more parameters provided to the system via the user interface, the one or more parameters comprising one or more of a date range, a time range, and a geographical origin of the data within the received dataset.

17. A system for generating proportional relationship diagrams for software service data, the system comprising:

a user interface;

a memory for storing executable program code; and one or more electronic processors, functionally coupled to the memory and the user interface, the one or more electronic processors configured to:

receive a dataset from one or more servers, wherein the dataset comprises software service data;

remove extraneous data from the dataset;

extract relevant data points from the remaining data in the dataset, wherein the relevant data points include word bigrams;

automatically filter the dataset by removing relevant data points below a minimum occurrence threshold, wherein the minimum occurrence threshold is dynamically determined based on a period of time over which the dataset is collected;

determine one or more relational data strings within the extracted relevant data points, wherein the relational data strings comprise two or more related word bigrams;

determine a frequency of occurrence for each of the extracted relevant data points within the dataset;

remove extracted relevant data points based on determining that the frequency of occurrence of the extracted relevant data points is below a predetermined threshold;

generate the proportional relationship diagram based on one or more parameters provided to the system via the user interface by plotting the relevant data points, wherein the relevant data points are plotted based on the determined relational data strings and the determined frequency of occurrence; and export the generated proportional relationship diagram, wherein the exported proportional relationship diagram is exported as one or more of an image file and an interactive dataset.

18. The system of claim 17, wherein the one or more parameters comprise one or more of a date range, a time range, and a geographical location.

* * * * *